United States Patent [19]

Klein

[11] 4,059,880

[45] Nov. 29, 1977

[54] METHOD OF MAKING AN APPARATUS FOR DYEING AND PRINTING OF MATERIALS

[75] Inventor: Norman E. Klein, Inman, S.C.

[73] Assignee: Milliken Research Corporation, Spartanburg, S.C.

[21] Appl. No.: 604,582

[22] Filed: Aug. 14, 1975

Related U.S. Application Data

[62] Division of Ser. No. 430,527, Jan. 3, 1974, abandoned.

[51] Int. Cl.² .................. B23P 15/00; B23P 13/00
[52] U.S. Cl. ..................... 29/157 C; 29/463; 29/445; 29/DIG. 26; 68/205 R
[58] Field of Search ............ 29/157 C, 463, 445, 29/DIG. 26; 408/1, 87, 80, 81; 68/205 R, 200; 118/314; 239/600, 555, 557; 134/64, 122, 172

[56] References Cited

U.S. PATENT DOCUMENTS

| | | | |
|---|---|---|---|
| 1,148,065 | 7/1915 | Warren | 408/1 |
| 1,266,501 | 5/1918 | Leitch | 239/555 |
| 2,469,804 | 5/1949 | Weaver | 29/DIG. 26 |
| 2,807,437 | 9/1957 | Roush | 29/156.8 H |
| 2,817,397 | 12/1957 | Brumbaugh | 239/557 |
| 2,829,470 | 4/1958 | Johnson | 408/87 |
| 3,424,114 | 1/1969 | Short | 112/79 |
| 3,570,275 | 3/1971 | Weber et al. | 239/127 |
| 3,739,461 | 6/1973 | Cupler | 408/1 |
| 3,874,599 | 4/1975 | Roger | 29/157 C |

FOREIGN PATENT DOCUMENTS

978,452  12/1964  United Kingdom.

*Primary Examiner*—C.W. Lanham
*Assistant Examiner*—Daniel C. Crane
*Attorney, Agent, or Firm*—Glen M. Burdick; H. William Petry

[57] ABSTRACT

Apparatus to apply dyestuff to a moving sheet of fabric which employs a unique construction of dye applicator or gun constructed basically in two clam shell sections with the clam shell sections being made in sets for ease of adjustment and installation. The dye applicator or gun includes a multiplicity of dye jets made by grooving each of the clam shell sections, mating the sections and then drilling the grooves to the proper size.

4 Claims, 13 Drawing Figures

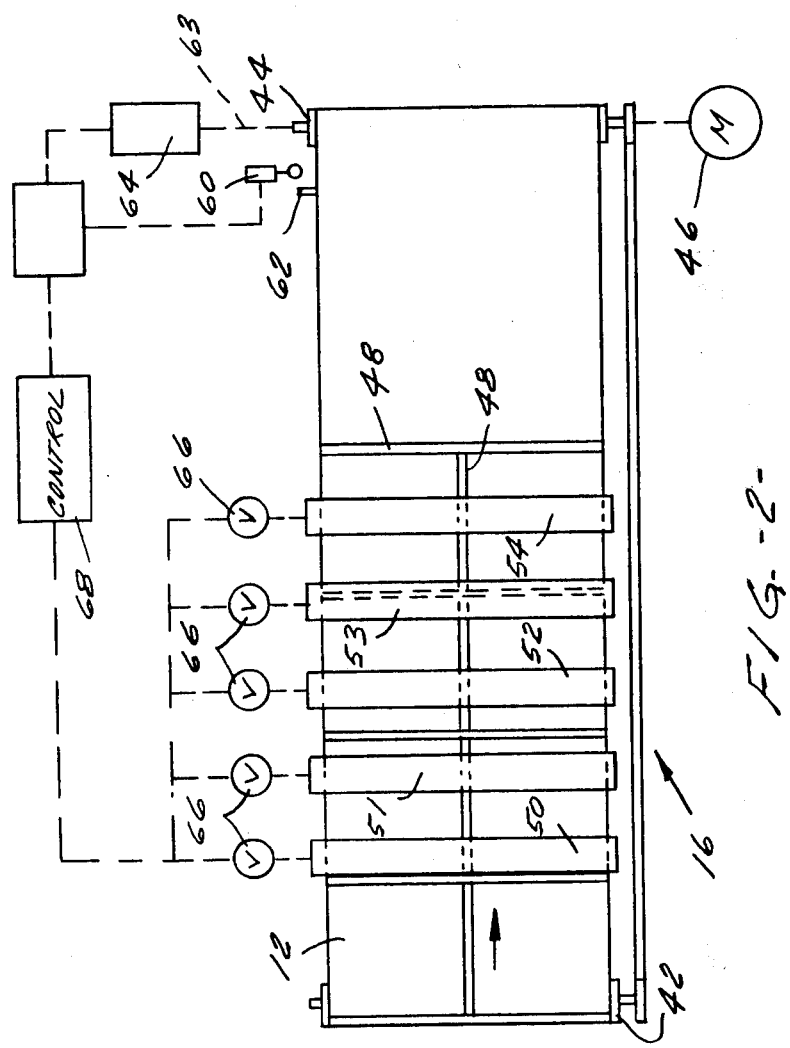

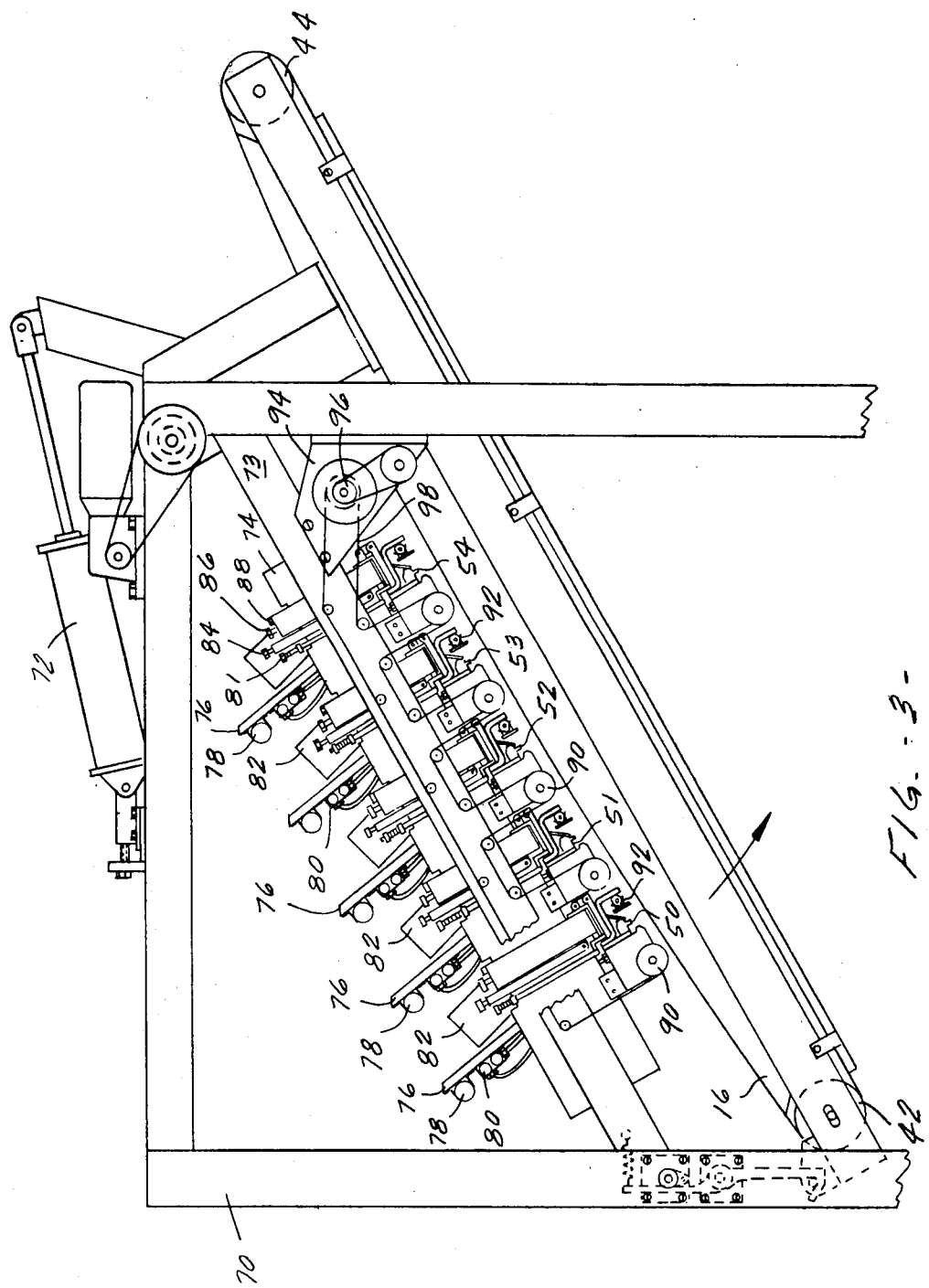

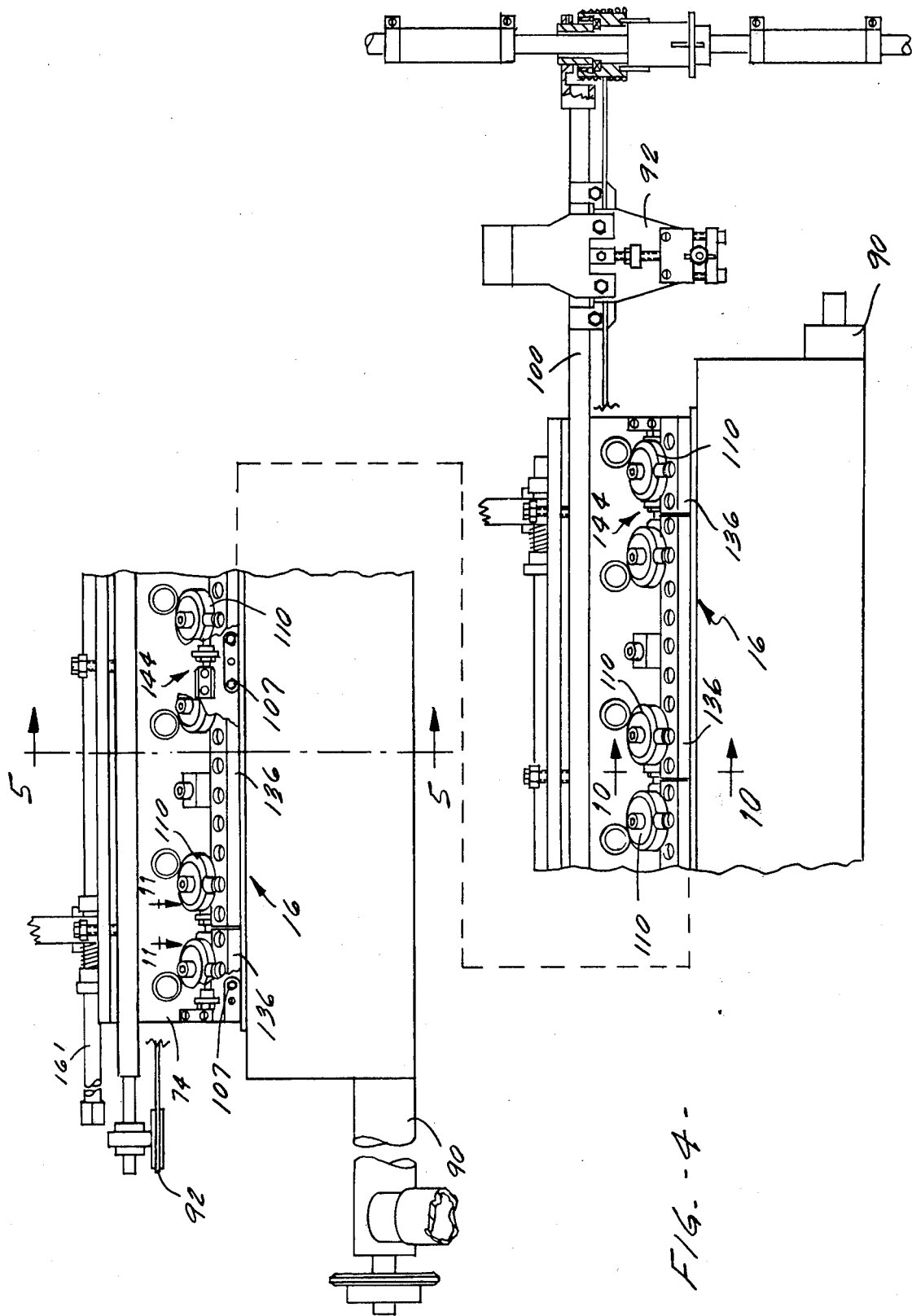

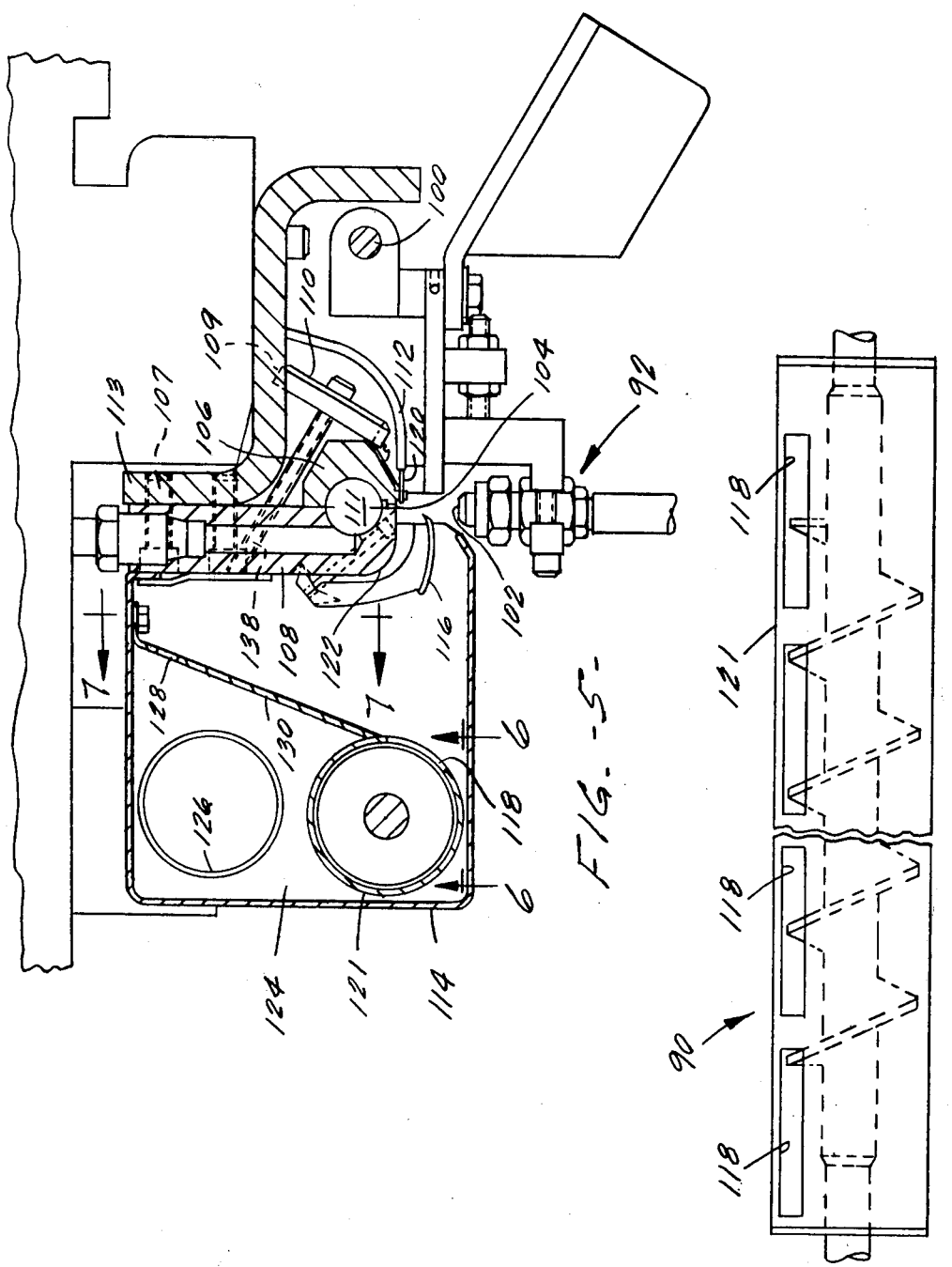

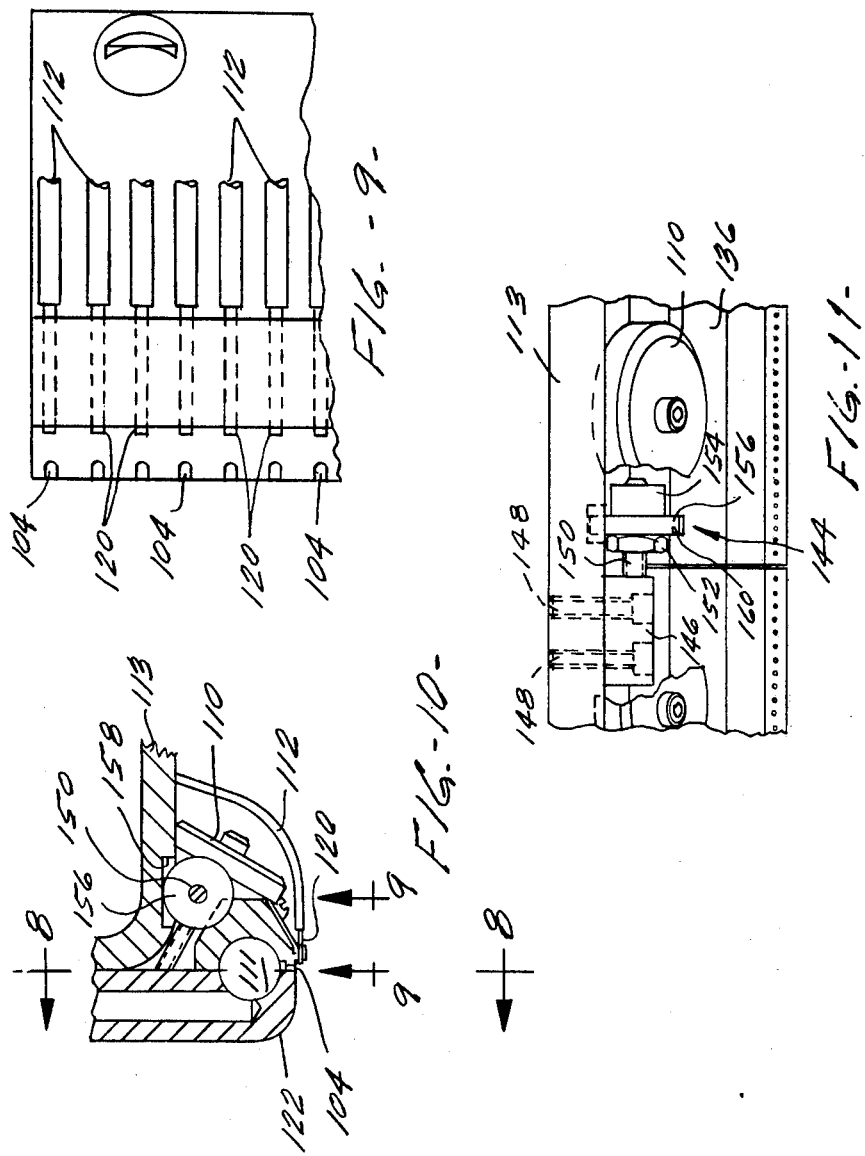

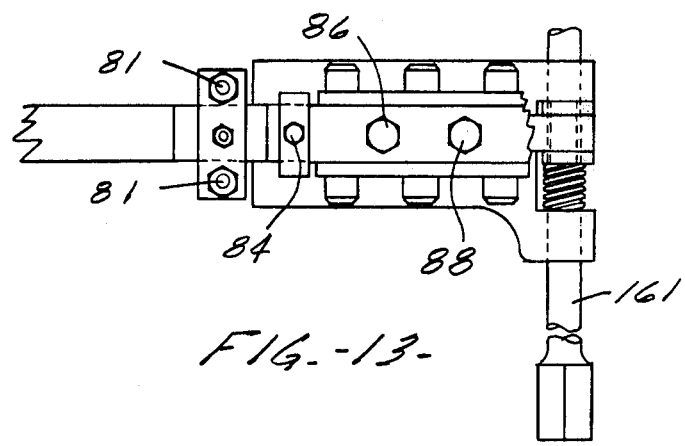
FIG.-13.-
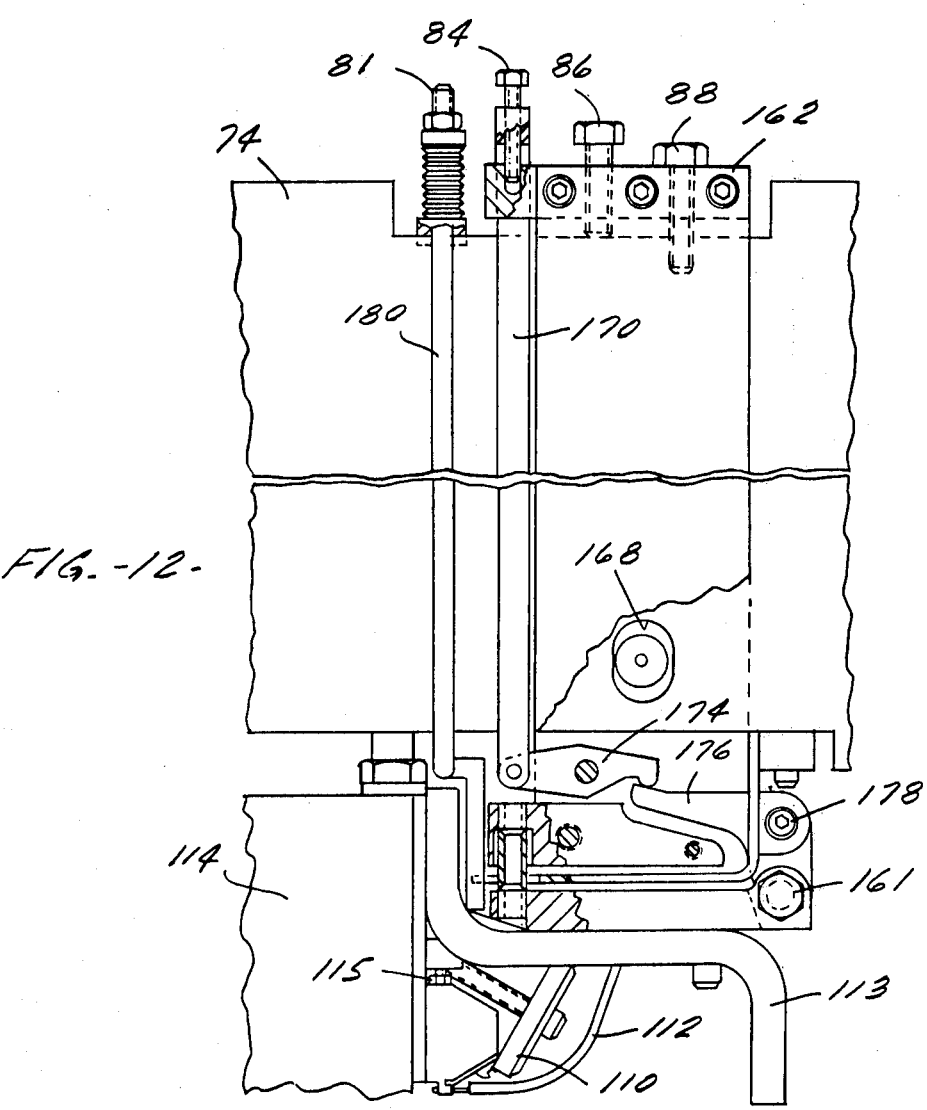
FIG.-12.-

METHOD OF MAKING AN APPARATUS FOR DYEING AND PRINTING OF MATERIALS

This is a division of application Ser. No. 430,527 filed Jan. 3, 1974, now abandoned.

This invention relates to the application of dyestuffs to textile materials and, more particularly, to the printing of textile fabrics having relatively porous surfaces, such as pile carpets.

Textile fibers and fabric materials have long been colored with natural and synthetic dyes, and, in particular, printed by color decoration of the surface or surfaces of the materials in definite repeated forms and colors to form a pattern. The color printing of textile fabrics has been accomplished in various ways. Earlier forms of printing used carved blocks charged with colored paste pressed against the fabric. Subsequently, speed of printing has been increased by the development of roller printing wherein moving fabrics are sequentially contacted by engraved metal rollers each containing a different color dye to form the desired pattern thereon. Textile fabrics are also printed by sequential contact with screens each having a porous portion of a pattern and carrying a particular color dyestuff.

More recently, it has been proposed to print textile fabrics, including pile carpets, by the programmed spraying or jetting of plural colored dyes onto the surface of a moving fabric. Typical of such processes and apparatus are described in U.S. Pat. No. 3,443,878; U.S. Pat. No. 3,570,275; and British Pat. No. 978,452. Generally, such apparatus consists of a plurality of dye applicator bars spaced along the direction of movement of the textile material and each containing multiple dye nozzles or jets extending transversely across the moving material. Each jet may be activated by suitable electric, pneumatic, or mechanical means to dispense dyes onto the moving material in a desired sequence, and pattern control of the jets may be accomplished by suitable programming means, such as coded punch tapes, magnetic tapes, computers, and the like.

U.S. Pat. Nos. 3,443,878 and 3,570,275 disclose specific means for applying streams of dyes to print a fabric by use of continuously flowing streams of dyes which are deflected by a stream of air to either impinge the dyestream upon the fabric or recirculate it to a reservoir. Control of such systems to form printed patterns may be accomplished by various of the aforementioned programming and control means.

In order to provide a greater variety of colors or shades of colors to the fabrics by use of such spray printing apparatus, it has also been proposed to apply different colors to the same locations or areas of the fabric to thereby blend primary colors in situ.

It can be appreciated that in the application of different colored dyes to the surface of textile fabrics, it is extremely important to accurately place each dyestuff on the fabric, particularly when intricate patterns are being printed and when in situ blending is employed. In dyeing relatively porous textile fabrics, such as pile carpets, it is also important that a carefully controlled amount of dye be applied to each dyed area on the pile surface to ensure optimum penetration of the dye color to the depth of the pile fiber without undesirable spread of the color into adjacent areas of the fabric. U.S. Pat. No. 3,393,411 discusses such a problem of dye penetration of pile carpet and suggests controlling the flow rate of the dyestuff and the speed of movement of the pile carpet past the dye application point to provide the desired amount of dye to the carpet.

In printing pile carpets with detailed patterns of colors, it can be appreciated that the dye jet applicators are very closely spaced relative to each other to permit dyeing in fine detail on the pile surface. The mounting, construction or programmed control of various gun bars for application of various dyestuffs to moving webs are also disclosed in one or more of British Pat. Nos. 1,201,598; 1,201,600; 1,201,599; and 1,202,345.

The present invention deals with improvements in the jet printing of textile products including pile fabrics and, in particular, in the accurate placement of increments of dye at specific locations on and/or in the surface of the pile fabrics to improve the pattern definition in such fabrics.

Therefore it is an object of the invention to provide a new and improved dye jet gun bar which is more efficient in operation and easily manufactured.

The present invention will be better understood by reference to the accompanying drawings which disclose a specific embodiment of the invention, and wherein:

FIG. 2 is an enlarged schematic plan view of the jet dye application portion of the apparatus of FIG. 1, showing in more detail the cooperative relation and operation of the conveyor with the jet gun bars;

FIG. 3 is a blown-up view of the jet dye applicator shown;

FIG. 4 is a partially schematic front view of one row of the jet dye application unit;

FIG. 5 is a cross-sectional view taken on line 5—5 of FIG. 4;

FIG. 6 is a view taken on line 6—6 of FIG. 5 showing the dye recirculation auger unit;

FIG. 9 is a front view taken on line 9—9 of FIG. 10 showing the front of the gun bar;

FIG. 10 is a cross-sectional view taken on line 10—10 of FIG. 4;

FIG. 11 is a view taken on line 11—11 of FIG. 4; and

FIGS. 12 and 13 illustrate various features of the adjusting means for the dye jet gun bar.

Figure 1:
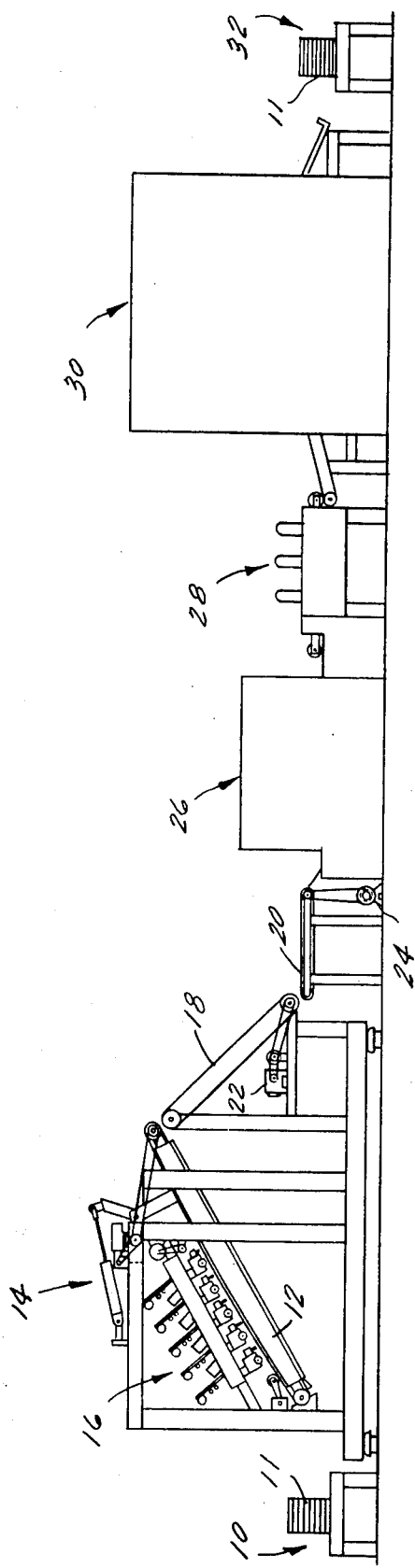
FIG. 1 is a schematic side elevation of apparatus for the jet dyeing of textile materials.
Figure 7:
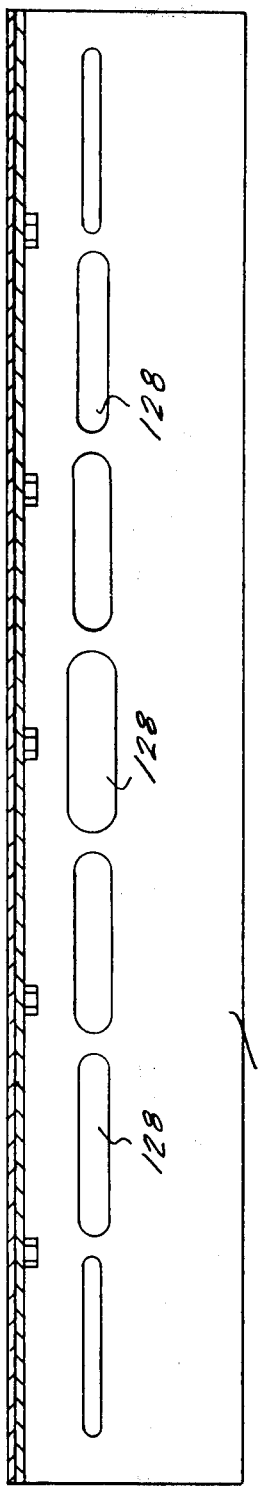
FIG. 7 is a top view of the air and dye deflection plate taken on line 7—7 of FIG. 5.

Referring more specifically to the drawings, FIG. 1 shows a jet dyeing apparatus for color printing textile fabrics such as pile carpets, tiles, and the like. As seen, the apparatus consists of a tile supply table 10 where a plurality of tiles 11 is fed manually, or by suitable automatic mechanical means, not shown, onto the lower end of an inclined conveyor 12 of a jet dye applicator 14 where the tiles are suitably printed by the programmed operation of a plurality of jet gun bars 16 in a manner which will be explained. The printed tiles leaving the dye applicator are moved by conveyors 18, 20 and driven by motors 22, 24, respectively, to a steam chamber 26 where the dyestuffs are fixed on the textile material. The tiles leaving steam chamber 26 are conveyed through a washer 28 and dryer 30 to a collection table 32 where they are accumulated either manually or by suitable automatic means, not shown, for subsequent use.

Details of the present invention are best shown by reference to FIG. 2 which is an enlarged schematic plan view of the jet dye applicator 14 of FIG. 1 and shows the endless conveyor 12 which is suitably supported for movement about rotatable rollers 42, 44 and driven by motor means 46. When it is desired to print carpet tiles of rectangular or square shape, the conveyor 12 is provided with a series of separator bars or spaces 48 which accurately position the tiles in spaced relation to each other on the conveyor. During movement of the conveyor, the tiles pass sequentially adjacent and beneath gun bars 16, five of which, 50–54, are shown schematically spaced along the path of travel of the conveyor and extending across its full width. Each jet gun bar is made up of a plurality of individual jet orifices which supply dyes in narrow streams to the surface of the pile carpet tiles. The stream of dyes issuing from each orifice of the gun bar is controlled individually by suitable means, which will be explained.

Each gun bar includes a dye supply manifold connected to the jet orifices of the bar which is supplied with liquid dyestuff from a reservoir so that each bar may be provided with a different color dye for printing the tiles. Typically, each gun bar may be provided with a primary color and operation of the individual jets of the gun bar are programmed to produced a desired pattern, with blending of the primary colors in situ on the surface of the carpet to provide many different shades and colors.

To ensure that the streams of dyestuff strike the carpet tile at an exact location to form the pattern in the carpet tile, control means are provided for coordination of the firing of each particular dye jet of the gun bars at the right time to the movement of the conveyor transporting the tiles for printing. As broadly shown in FIG. 2, the control system is provided with a synchronization switch 60 which is activated by a mechanical trip finger 62 attached to the edge of the conveyor 12 to engage the switch 60 at a given position of conveyor movement.

Operatively connected to the shaft 63 of roller 44 by suitable means, not shown, is a transducer 64 which converts the mechanical movement of conveyor 12 to a plurality of electrical pulses which activate firing of particular jets on the gun bars at desired positions of the conveyor, by controlling the pneumatic valves 66 through a suitable control 68.

Looking now to FIG. 3, the jet dye applicator 14 is shown enlarged to more clearly illustrate the relationship of the individual elements. The conveyor 12 of the jet dye applicator 14 is pivotally mounted in a frame 70 on top of which is mounted a piston 72 to pivot the conveyor 12 from the position shown in solid lines to a position away from the jet dye guns 50–54 so that access can be readily made to the jet dye guns 50–54 and associated apparatus.

The jet dye apparatus basically is supported by two spaced apart plate members 74 which in turn are attached to frame members 73. Mounted on frame members 73 is an upstanding support member 76 on which is mounted an air manifold 78, a dye header pipe 80 and a box 82 to support a plurality of valve cards with electrically operated pneumatic valves mounted thereon. Projecting upwardly from the support member 74 is a plurality of screw members 81, 84, 86 and 88 for adjustment of the jet dye applicator gun bars.

Shown schematically at the bottom of the support member 74 at each position of the jet dye gun bars is an auger member 90 to recirculate dye liquid back to the dye reservoir and a jet orifice washer 92 to wash out the dye openings of the dye jet guns. Mounted on one of the vertical frame members through a suitable support 94 is a driven pulley 96 which drives the auger member 90 through a suitable drive belt 98 and idler pulleys.

As shown broadly in FIG. 3 and in more detail in FIGS. 4 and 5 the dye jet orifice washer 92 is slidably mounted on a bar 100 mounted across each of the gun bars so the washer 92 is so aligned with each of the gun bars that the pressure water orifice 102 is directly in line with the orifices 104 of the gun bar in order to squirt a jet of water therein to counteract dye liquor jet action and backwash and dislodge any particles of foreign matter.

FIG. 5, which is a cross-sectional view through one of the dye jet structures of FIG. 4, shows wherein the gun bars 16 consist of a Z shaped member 113 attached to second portion 108 by screws 107 and which in turn supports first portion 106 being locked thereto by suitable screw washer assembly 110 which engages notch 109 in the Z bar support member 113 and the top of the first portion 106. Z shaped member 113 and second portion 108 provide an accurate plane surface which coacts with the upper portion 106 when clamped securely thereto to provide a non-leak construction. As described previously dye from cavity 111 is supplied continuously from jet 104 and the pattern in the fabric being dyed is controlled by cutting off or cutting on the air pressure to selected air lines 112 to divert the dye liquid into the collection and separation chamber 114. Extending across the chamber 114 is a deflector or cut off 116 which tends to direct dye in the air stream toward the openings 118 in the cylinder 121 around the auger member 90. The dye in the composite stream from the air nozzles 120 and 104 separates from the said stream partially due to the Coanda or surface attachment effect around air foil shape 122 of the bottom of the second portion 108 of the gun bar and to the suction pressure applied to the chamber 124 by suction line 126 to pull the air through the openings 128 in the plate 130. The air foil shape 122 of the bottom of the second portion 108 and the deflector 116 together form a nozzle therebetween to provide a venturi effect which acts to pull air into the collection and separation chamber.

The unused dye that falls into the catch basin or chamber 114 is delivered to the auger member 90 through openings 118 in the cylinder 121 and is positively delivered back to the dye containers 80 by the screw action of the auger member 90.

Figure 8:
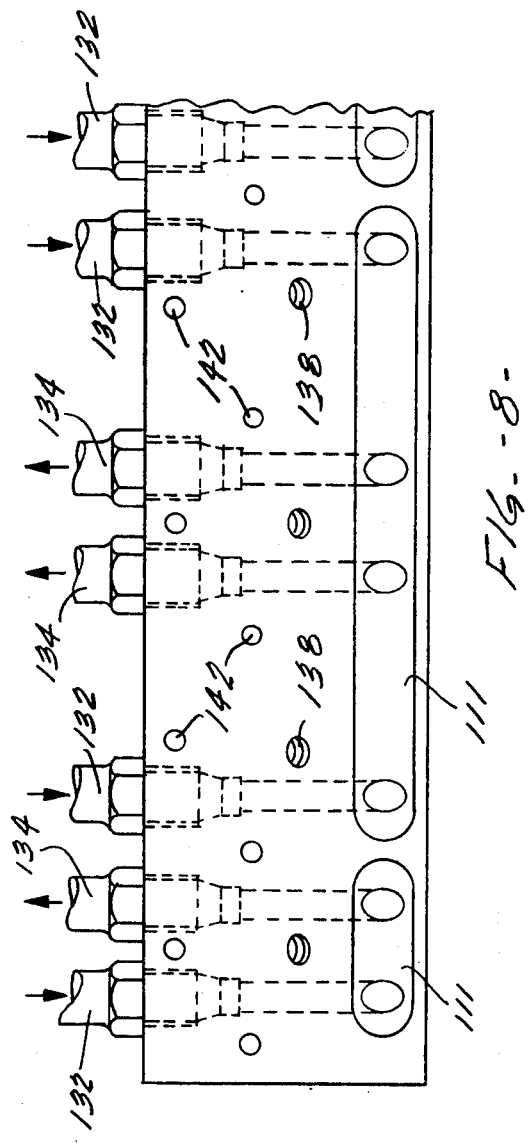
FIG. 8 is a top view taken on line 8—8 of FIG. 10 showing the top half of the dye gun bar removed.

As briefly described before, the air for the multiplicity of air lines 112 for each gun bar jet position comes from their respective electro-air relays on card 82 receiving air from air manifold 78. At the same time the desired dye is supplied to the cavities 111 in the gun bars 16 from the dye headers 80 via conduit 132 and recirculated thereto via conduit 134 as shown in FIG. 8. As disclosed, the dye from the auger member 90 is also recirculated to the dye header 80. In practice, the dye from the conduit 134 and the auger member is recirculated to an atmospheric container from which it is pushed to the cavity 111 through the supply conduit 132. As is evident, a closed system is provided wherein all or almost all of the unused dye in the system is recirculated for use thereby minimizing dye liquor loss and consequent dye make-up. To supply dye liquor from the atmospheric container, a suitable pump with a filter on the outlet thereof is used.

As noted previously the gun bars 50–54 basically consist of a first portion 106 and a second portion 108 mated together and secured in position by clamp screw washer assembly 110. It should be noted (FIG. 4) that each line of gun bars 50–54 is composed of a plurality of sets 136 of dye jets so that individual sets can be removed without moving other sets in the same line of gun bars. The screw washer assemblies 110 engage threaded holes 138 in the portions 106 and 108 to hold the gun portions 106 and 108 together. The second portion 108 is secured to the Z bar 113 by suitable means, such as screws placed in openings 142 (FIG. 8) to strengthen the array and keep it straight. As is evident screw 110 places a force on the portions 106 and 108 which has two vector components to provide a quadrature seating action in two directions to seat the first portion 106 on second position 108 and to hold the first portion in position against the stop screw 115 (FIG. 12).

The jet dye orifices 104 in the gun bar which communicate with the dye chamber 111 are made in a unique manner. Preferably the orifices 104 are etched or grooved in the first portion 106 before being mated so that the orifice 104 will be complete when the sections are mated. Another way to perform this job is to etch or groove the sections 106 and 108 with a radius less than desired and then drill the mated sections through the grooves to provide the desired orifice opening. This provides a lead hole so that subsequent drilling to the desired size will be straight, true and in proper position to provide parallel jet streams. These two methods provide for the construction of orifices of a desired size without the disadvantages of removing broken drill bits, misaligned holes and wandering of the drill into adjacent holes, thereby ruining the whole gun bar.

FIGS. 4, 10 and 11 show a key arrangement, generally designated 144, to ensure that each first portion 106 in each set 136 of the gun bars 50–54 is aligned laterally when placed in position. To accomplish this end, a plurality of block members 146 are connected to the Z bar 113 by suitable means, such as screws 148, and has a stud member 150 projecting outwardly therefrom. Screwed onto the stud member are lock nuts 152 and 154 and circular key member 156. To position the particular gun bar the lock nuts 152 and 154 lock the key member 156 in the desired position on the stud member 150 with one portion engaging the notch 160 in the first portion 106 which automatically positions the gun bar set in its proper position relative to other sets 136 in the gun bar arrangement.

FIGS. 12 and 13 in conjunction with FIG. 4 show various adjustment apparatus to adjust various components of the system. FIG. 13 is a back view of FIG. 4 and shows basically a spring loaded adjustment bar 161 suitably connected to the support member which when screwed in or out moves a particular gun bar arrangement laterally in relation to neighboring sets 136 and the conveyor 12 to position it relative to the fabric to be dyed while moving with the conveyor.

FIG. 13 illustrates various mechanisms to adjust the position of the individual gun bars 50–54. At each gun bar position 50–54 a support member 162 is located which is attached to support member 74 by a pair of screws 86 and 88 which when adjusted vary the height of the gun bar within the range of the long diameter of the slot 168 in the support member 74. Also attached to the support member 162 is an elongated link 170 which can be moved up and down by the adjustment of screw 84 to move the gun bars 50–54 back and forth through linkages 174 and 176 to pivot about the pivot point 178. Also, connected to the support member 74 is another bar 180 to provide spring-force loading to assist gravity force in closing the fore-aft position linkage and to provide a bias force-tilt to the gun bar assembly about lateral adjustment shaft 161. As can readily be seen three rectilinear modes of adjustment of each of the gun bars 50–54 are provided. These modes of adjustment are up and down, back and forth, and lateral movement of the gun bars. At the same time angular adjustment is achieved through differential adjustment of the screws described above. These adjustments provide great flexiblity in adjusting the position of dye jet apparatus relative to the product to be dyed.

The herein described apparatus and method provide a novel fabric dyeing apparatus with a unique dye jet gun bar which can be readily manufactured, easily assembled and adjusted and is efficient in operation.

Although the preferred form of the invention has been specifically described herein, it is contemplated that many changes may be made without departing from the scope or spirit of the invention, and it is desired that the invention be limited only by the scope of the claims.

That which is claimed is:

1. The method of making a dye applicator of a gun bar for applying dye to a material comprising the steps of providing a first member with a substantially flat face having a cavity therein, provided a second member with a substantially flat face having a cavity therein, providing at least one groove in the face on one of said members which communicates with said cavity and an outer edge of said face therein, mating said faces of said first and second members so that the cavities of the members form a chamber and providing a clamping force on said members which produces a perpendicular and a parallel force effect with respect to the mating faces to hold said members in engagement and to facilitate alignment of the edges of said faces adjacent said groove.

2. The method of claim 1 including the step of providing at least one groove in the face of the other members which mates with the groove in the face of said one member when the cavities of the members are in communication.

3. The method of claim 2 further including the step of providing a conduit within one of said members, said conduit providing fluid communication between said cavity and a dye supplying source.

4. The method of claim 2 wherein the mating grooves in said members form an orifice of desired size, and drilling the orifice after mating of the members to a larger desired size.

* * * * *